3,582,470
METHOD OF PRODUCING 5-AMINO-4-IMIDAZOLECARBOXAMIDE RIBOFURANOSIDE BY FERMENTATION
Haruo Tsuri, Koichi Takinami, and Teruo Shiro, Kanagawa-ken, and Hiroshi Okada, Tokyo, Japan, assignors to Ajinomoto Co., Inc., Tokyo, Japan
No Drawing. Continuation of application Ser. No. 554,319, June 1, 1966. This application July 10, 1969, Ser. No. 859,524
Claims priority, application Japan, June 12, 1965, 40/34,862
Int. Cl. C12d 13/06
U.S. Cl. 195—28                                                    7 Claims

ABSTRACT OF THE DISCLOSURE

The yield of AICAR by fermentation of otherwise conventional culture media by means of certain strains of *Bacillus subtilis* and *Bacillus megaterium* is sharply increased when the media are neutralized by means of gaseous ammonia and contain more than 10 mg./dl. magnesium ions.

---

This application is a continuation of our copending application Ser. No. 554,319, filed on June 1, 1966, and now abandoned.

The present invention relates to a method of producing 5-amino-4-imidazolecarboxamide ribofuranoside (hereinafter referred to as AICAR) by fermentation.

AICAR is being used as an intermediate for synthesizing components of nucleic acid, which are valuable as seasonings, and is also a raw material for synthesizing pharmaceuticals.

It is known that AICAR can be produced on a industrial scale by fermentative processes in which certain mutants of *Bacillus subtilis* or *Bacillus megaterium* are cultured on a nutrient medium containing a carbon source, a nitrogen source, and other nutrients, and AICAR is recovered from the culture broth.

The known AICAR fermentation method is often interfered with by excessive bacterial growth or metabolism and by spore formation.

We have found that AICAR fermentation can be improved by the presence of a high concentration of magnesium or calcium ions in the culture medium to control spore formation and increase the yield of AICAR.

It is well known that the pH of a fermentation medium may be adjusted with calcium carbonate, sodium hydroxide, potassium hydroxide, ammonia water or gaseous ammonia during the fermentation, and gaseous ammonia is preferably used in industrial fermentation using jar fermentors, because solid calcium carbonate damages the apparatus and the total volume of medium is increased in the cases of sodium hydroxide, potassium hydroxide or ammonia water.

We have found that the yield of AICAR can be increased and spore formation can be controlled when the AICAR fermentation is carried out in a culture medium containing magnesium ions in a concentration of more than 10 mg./dl. while neutralizing the medium with gaseous ammonia.

Magnesium ion is essential for the growth of microorganisms, and is generally used in a concentration of about 4 mg./dl. According to the present invention, magnesium sulfate is used in preference to magnesium chloride. Magnesium ions may also decrease the necessary amount of phosphate ion, as well as potassium ion.

The bacteria whose production of AICAR benefit substantially from the present invention include *Bacillus megaterium* MA–336 (ATCC No. 15117), *Bacillus megaterium* MA–658 (ATCC No. 15118), *Bacillus subtilis* D–422 (ATCC No. 15115), *Bacillus subtilis* D–2511 (ATCC No. 15116) and *Bacillus subtilis* D–421 (J. Agricultural and Biological Chemistry, 26, 758, 1962). All members of the family Bacillus which produce AICAR by fermentation were found to give at least slightly better AICAR yields with high concentration of Mg and Ca ions than without.

EXAMPLE 1

*Bacillus subtilis* D–2511 (ATCC No. 15116) was cultured on a medium containing

|  | G./dl. |
|---|---|
| Glucose | 7 |
| $FeSO_4 \cdot 7H_2O$ | 0.001 |
| $MnSO_4 \cdot 4H_2O$ | 0.001 |
| $NH_4Cl$ | 1.0 |
| Ribonucleic acid | 0.3 |
| Casein hydrolyzate | 0.4 |
| $MgSO_4 \cdot 7H_2O$ | (1) |

[1] As stated in Table 1.

The medium was adjusted to pH 7.4 with potassium hydroxide, and 15 liter batches of the medium were placed in 20 liter fermentors, sterilized, and inoculated. The pH was thereafter adjusted to a value of 6.0 by introducing gaseous ammonia, and kept at that value by introducing gaseous ammonia with the fermentation air while the microorganism was cultured on the medium for 60 hours at 30° C. When the fermentation was completed, AICAR was found to be produced as follows:

TABLE 1

| Amount of Mg ion (mg./dl.): | Amount of AICAR produced (g./l.) |
|---|---|
| 0 | 0.6 |
| 4 | 3.1 |
| 10 | 6.2 |
| 30 | 7.5 |
| 50 | 7.4 |

EXAMPLE 2

*Bacillus megaterium* MA–336 (ATCC No. 15117) was cultured on a medium of the following composition:

|  | G./dl. |
|---|---|
| Starch acid hydrolyzate (glucose equivalent) | 8 |
| $FeSO_4 \cdot 7H_2O$ | 0.001 |
| $MnSO_4 \cdot 4H_2O$ | 0.001 |
| $NH_4Cl$ | 1.3 |
| Yeast extracts | 0.03 |
| Ribonucleic acid | 0.11 |
| Soybean hydrolyzate | 0.8 |
| $MgSO_4 \cdot 7H_2O$ | (1) |
| $CaCl_2 \cdot 2H_2O$ | (2) |

[1] As stated in Tables 3 and 4.
[2] As stated in Tables 2 and 4.

at 30° C. for 65 hours.

TABLE 2

|  | Spores, percent | AICAR, g./l. |
|---|---|---|
| Ca ion added, mg./dl.: |  |  |
| 0 | 70–80 | 9.1 |
| 10 | 10–15 | 10.3 |
| 50 | 1–2 | 14.2 |
| 100 | 1–2 | 13.9 |
| 250 | 1–2 | 14.1 |

Each medium contained 0.04 g./dl. of $MgSO_4 \cdot 7H_2O$. The medium which did not contain Ca ion was cultured for 75 hours.

TABLE 3

| Mg ion added, mg./dl.: | Spores, percent | AICAR, g./l. |
|---|---|---|
| 0 | 40–50 | 9.9 |
| 4 | 35–45 | 10.1 |
| 10 | 5–10 | 13.5 |
| 30 | 1–5 | 13.7 |
| 50 | 1–5 | 13.6 |

The medium which did not contain Mg ion was cultured for 75 hours.

TABLE 4

| | |
|---|---|
| Ca ion added (mg./dl.) | 100 |
| Mg ion added (mg./dl.) | 30 |
| Spores (percent) | 1–2 |
| AICAR (g./l.) | 15.4 |

Spore formation was evaluated by counting spores and cells in a microscopic field, and the percentage of spores was calculated on the basis of the combined number of spores and cells.

We claim:
1. In a method of producing AICAR by culturing a microorganism from the genus Bacillus on an aqueous medium containing an assimilable carbon source, an assimilable nitrogen source, organic nutrients, and inorganic ions necessary for the growth of said microorganism, the improvement which comprises:
 (a) introducing enough gaseous ammonia into said medium during said culturing to keep the same substantially at pH 6; and
 (b) maintaining in said medium a concentration of magnesium ions of more than 10 mg./dl. during said culturing.
2. In a method as set forth in claim 1, said microorganism being a member of the species Bacillus megaterium or Bacillus subtilis.
3. In a method as set forth in claim 2, said microorganism being selected from the strains having ATCC numbers 15115, 15116, 15117, and 15118.
4. In a method as set forth in claim 1, said medium being sterilized and thereafter inoculated with said microorganism, said concentration of said magnesium ions being maintained in said medium substantially from the time of said inoculating.
5. In a method as set forth in claim 4, said magnesium ions being present in said medium during said inoculating.
6. In a method as set forth in claim 1 said ions being added to said medium in the form of water-soluble salts.
7. In a method as set forth in claim 6, said salts being selected from the group consisting of magnesium sulfate and magnesium chloride.

References Cited

UNITED STATES PATENTS 3,238,110  3/1966  Shiro et al. _____ 195—28N

ALVIN E. TANEHOLTZ, Primary Examiner